US012771261B2

(12) United States Patent
Shoji et al.

(10) Patent No.: US 12,771,261 B2
(45) Date of Patent: Oct. 20, 2026

(54) POWER CONVERSION DEVICE

(71) Applicant: HITACHI ASTEMO, LTD., Hitachinaka (JP)

(72) Inventors: Ryota Shoji, Hitachinaka (JP); Kenichiro Nakajima, Hitachinaka (JP); Yuta Numakura, Hitachinaka (JP); Shoya Awamori, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 258 days.

(21) Appl. No.: 18/729,558

(22) PCT Filed: Feb. 22, 2022

(86) PCT No.: PCT/JP2022/007425
§ 371 (c)(1),
(2) Date: Jul. 17, 2024

(87) PCT Pub. No.: WO2023/162052
PCT Pub. Date: Aug. 31, 2023

(65) Prior Publication Data

US 2026/0180461 A1 Jun. 25, 2026

(51) Int. Cl.
*H02M 7/00* (2006.01)
*H02M 7/48* (2007.01)

(52) U.S. Cl.
CPC .............. *H02M 7/003* (2013.01); *H02M 7/48* (2013.01)

(58) Field of Classification Search
None
See application file for complete search history.

(56) References Cited

U.S. PATENT DOCUMENTS

2007/0109715 A1 5/2007 Azuma et al.
2009/0040724 A1 2/2009 Nishikimi et al.
(Continued)

FOREIGN PATENT DOCUMENTS

JP 2000-152662 A 5/2000
JP 2007-143272 A 6/2007
(Continued)

OTHER PUBLICATIONS

International Search Report with English Translation in corresponding International Application No. PCT/JP2022/007425, dated Apr. 12, 2022.

*Primary Examiner* — Crystal L Hammond
*Assistant Examiner* — Seung Ho Choi
(74) *Attorney, Agent, or Firm* — Foley & Lardner LLP

(57) ABSTRACT

A power conversion device includes a plurality of power modules; a plurality of smoothing capacitors; a first DC bus bar; and a second DC bus bar. The first and second DC bus bars include positive and negative electrode bus bars laminated on each other. The plurality of Smoothing capacitors are disposed between the first DC bus bar and the power module. The first DC bus bar includes a protrusion portion that passes between the plurality of smoothing capacitors and extends to a disposition side of the power module, and a first connection portion connected to the smoothing capacitor. The protrusion portion includes a second connection portion connected to the second DC bus bar. The second DC bus bar includes a third connection portion connected to the power module and a fourth connection portion connected to the second connection portion.

6 Claims, 7 Drawing Sheets

(56) References Cited

U.S. PATENT DOCUMENTS

| | | | |
|---|---|---|---|
| 2015/0305188 | A1* | 10/2015 | Maeda |
| 2018/0358903 | A1* | 12/2018 | Takahashi |

FOREIGN PATENT DOCUMENTS

| | | | |
|---|---|---|---|
| JP | 2010-030489 | A | 2/2010 |
| JP | 5961714 | B2 | 8/2016 |
| JP | 2018-207718 | A | 12/2018 |

* cited by examiner (a)

(b)

(a)

(b)

(a)

(b)

POWER CONVERSION DEVICE

TECHNICAL FIELD

The present invention relates to a power conversion device.

BACKGROUND ART

For a power conversion device, a two-story structure which is advantageous in terms of size reduction, assemblability, and electromagnetic compatibility (EMC) performance, in response to the size and vehicle layout required by customers has been studied. For example, PTL 1, which is a conventional technique, discloses a configuration of a power conversion device in which positive and negative electrode bus bars are individually connected to a power module and a capacitor.

CITATION LIST

Patent Literature

PTL 1: JP 5961714 B 2

SUMMARY OF INVENTION

Technical Problem

Conventionally, since the positive and negative electrode bus bars are individually connected to the power module and the capacitor, connection points (screw fastening points) are large and connection places are distributed. Further, since the positive and negative electrode bus bars which are DC power wirings are located far from the input position of a battery, the inductance is increased, and thus, it is necessary to suppress an increase in inductance without impairing the assemblability of the device. In view of such circumstances, an object of the present invention is to provide a power conversion device in which a reduction in inductance, size reduction, and improvement in assemblability are juxtaposed.

Solution to Problem

A power conversion device includes a plurality of power modules that converts DC power into AC power; a plurality of smoothing capacitors that smooths the DC power; a first DC bus bar that is connected to the plurality of smoothing capacitors; and a second DC bus bar that is connected to the plurality of power modules. The first DC bus bar and the second DC bus bar include a positive electrode bus bar and a negative electrode bus bar laminated on each other, and the plurality of smoothing capacitors are disposed between the first DC bus bar and the power module. The first DC bus bar includes a protrusion portion that passes between the plurality of smoothing Capacitors and extends to a disposition side of the power module, and a first connection portion that is connected to the smoothing capacitor on a surface of the smoothing capacitor opposite to a side on which the power module is disposed. The protrusion portion includes a second connection portion connected to the second DC bus bar, and the second DC bus bar includes a third connection portion connected to the power module and a fourth connection portion connected to the second connection portion.

Advantageous Effects of Invention

According to the present invention, it is possible to provide a power conversion device in which a reduction in inductance, size reduction, and improvement in assemblability are juxtaposed.

DESCRIPTION OF EMBODIMENT

Figure 1:
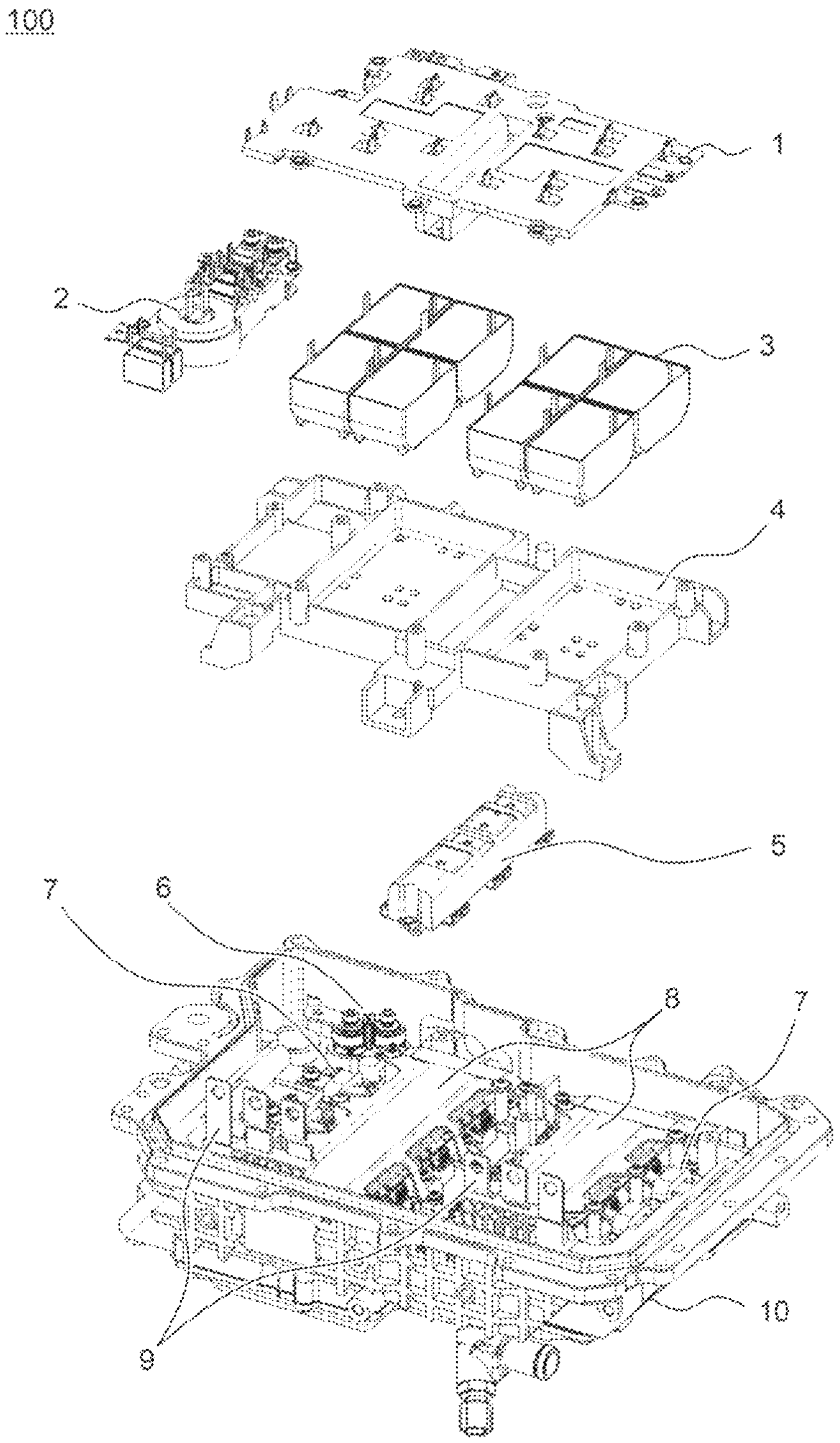
FIG. 1 is an exploded perspective view of a power conversion device according to an embodiment of the present invention.

Hereinafter, an embodiment of the present invention will be described with reference to the drawings. The following description and drawings are examples for describing the present invention, and will be omitted and simplified as appropriate for the sake of clarity of description. The present invention can be carried out in various other forms. Unless otherwise specified, each component may be singular or plural.

Positions, sizes, shapes, ranges, and the like of components illustrated in the drawings may not represent actual positions, actual sizes, actual shapes, actual ranges, and the like in order to facilitate understanding of the invention. Therefore, the present invention is not necessarily limited to the positions, the sizes, the shapes, the ranges, and the like disclosed in the drawings.

Embodiment and Overall Configuration of Present Invention

FIG. 1

A power conversion device 100 includes a first DC bus bar 1, a noise filter 2, a smoothing capacitor 3, a DC circuit storage member 4 (referred to as a case 4 below), a second DC bus bar 5, a DC connector 6, an AC sensor 7, a power module 8, an AC bus bar 9, and a housing 10.

Components of the above-described power conversion device 100 are disposed in the housing 10. In addition, the housing 10 has a function of forming a cooling flow path (not illustrated) cools the entirety of the t power conversion device 100 by disposition of the components therein. The power module 8 that generates heat can be cooled by disposition of the power module 8 on the cooling flow path in a screwed and fixed manner.

The power module 8 converts DC power input from an outside of the power conversion device 100 to the power conversion device 100 into AC power. In addition, the power module 8 is electrically connected to the AC bus bar 9 formed along the inner wall of the housing 10. The AC bus bar 9 is wired through the center of the AC sensor 7 having a shape having the penetrated center, whereby the AC sensor 7 can measure AC power flowing through the AC bus bar 9.

The second DC bus bar 5 is disposed between two power modules 8 disposed in the housing 10. The second DC bus bar 5 is electrically connected to the two power modules 8. The case 4 is a storage member made of metal, and is screwed and fixed to the housing 10. The case 4 functions as a unit of a DC circuit by housing and disposing the first DC bus bar 1, the noise filter 2, and the smoothing capacitor 3.

The first DC bus bar 1 is electrically connected to the smoothing capacitor 3, thereby smoothing DC power flowing through the first DC bus bar 1. The noise filter 2 and the DC connector 6 are electrically connected. The first DC bus bar 1 and the second DC bus bar 5 are electrically connected.

FIG. 2

Figure 2:
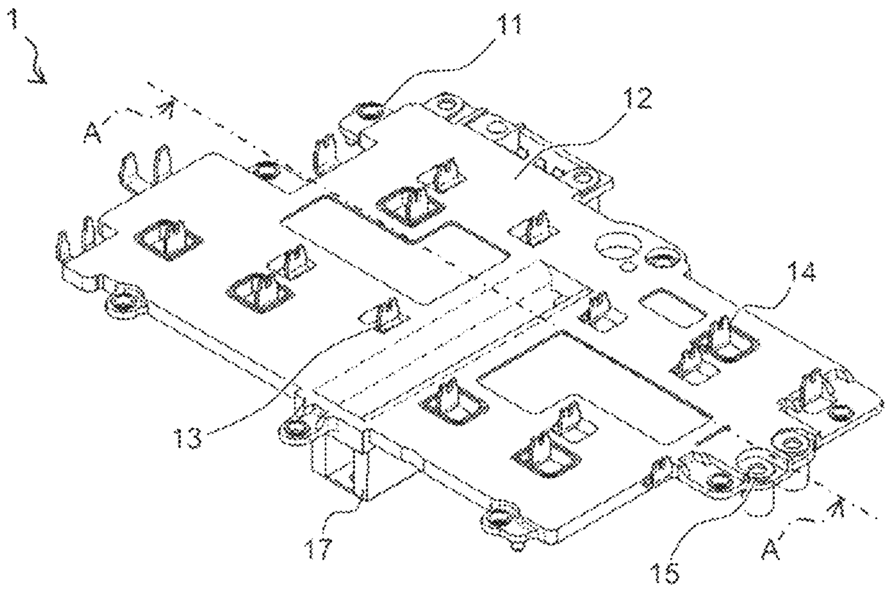
FIG. 2 is an explanatory diagram of a first DC bus bar.
Figure 2:
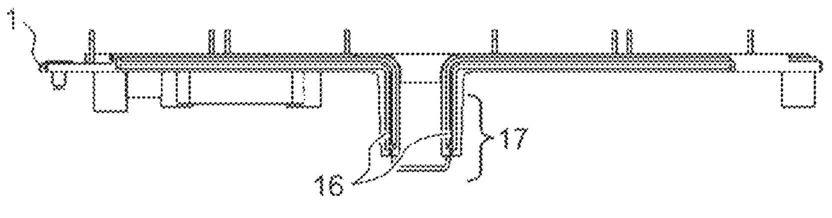
Figure 3:
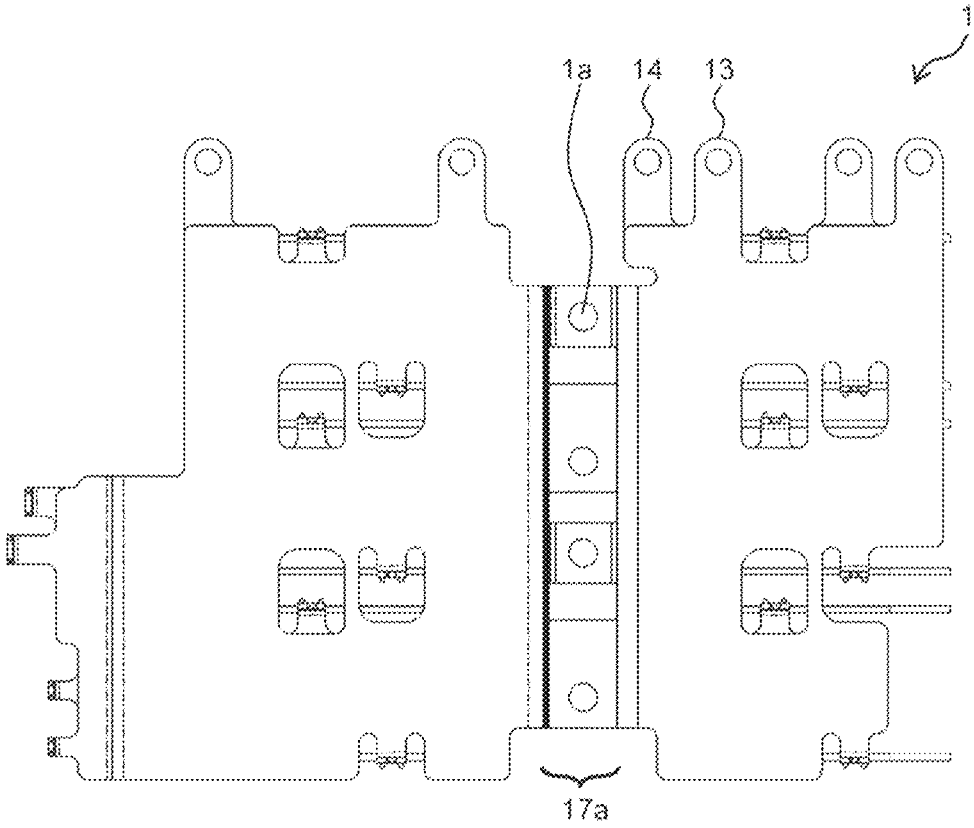
FIG. 3 is a view for describing a laminate structure of positive and negative electrode bus bars in the first DC bus bar.

FIG. 2(*a*) is a perspective view of the first DC bus bar 1, and FIG. 2(*b*) is an AA cross-sectional view of FIG. 2(*a*). In the first DC bus bar 1, a bush 11 and an insertion nut 15 are molded of resin as an assembling portion to the case 4 and an assembling portion to the component such as the smoothing capacitor 3. The bush 11 functions as a cushioning material when the first DC bus bar 1 is connected to the case 4. The insertion nut 15 functions as a fastening fixing portion for connection of the first DC bus bar 1 and a harness (not illustrated). The first DC bus bar 1 is fixed to the case 4 that stores the noise filter 2 and the smoothing capacitor 3, with a screw, a bolt, or the like.

The first DC bus bar 1 has a positive electrode bus bar 13 and a negative electrode bus bar 14 formed of copper or other metal. The positive electrode bus bar 13 and the negative electrode bus bar 14 each have a welding terminal for connection with the noise filter 2 and the smoothing capacitor 3. As described above, by connecting the first DC bus bar 1 and the smoothing capacitor 3 by welding, it is possible to reduce the size while increasing the lamination area on the smoothing capacitor 3 side.

The positive electrode bus bar 13 and the negative electrode bus bar 14 are laminated on each other, and in order to ensure insulation, insert molding 16 is performed between the positive electrode bus bar 13 and the negative electrode bus bar 14 with polyphenylenesulfide (PPS) or other resin. The first DC bus bar 1 is also overmolded 12 with PPS or other resin.

The first DC bus bar 1 has a protrusion portion 17 having a U-shaped cross section. Note that the U shape of the protrusion portion 17 refers to a deep trench shape having a convex cross-sectional shape, and means a drawn shape in the cross section, the drawn shape having a total of three surfaces including a connection surface with the bus bar (second DC bus bar 5) to which the first DC bus bar 1 is connected, and two surfaces erected on the connection surface.

The first DC bus bar 1 is electrically connected to the second DC bus bar 5 by using the protrusion portion 17. As a result, the area of a connection portion with the second DC bus bar 5 is increased. In addition, since the first DC bus bar 1 has the U-shape of the protrusion portion 17, the lamination area of the entirety of the positive electrode bus bar 13 and the negative electrode bus bar 14 is also increased.

When the first DC bus bar 1 is integrally formed, it is possible to increase the area of the surface layer as compared with the case where the first DC bus bar 1 is formed by division, and it is also possible to reduce the number of fixing points (connection points), so that the inductance is reduced and the number of parts can be reduced.

FIG. 3

The first DC bus bar 1 has a laminate structure in which the positive electrode bus bar 13 and the negative electrode bus bar 14 are laminated on each other. Each of the positive electrode bus bar 13 and the negative electrode bus bar 14 of the protrusion portion 17 of the first DC bus bar 1 has two sets of screw fastening points 1*a* which are connection points with the second DC bus bar 5. By providing a predetermined interval for sufficiently widening a space between the two sets of screw fastening points 1*a* and further providing a width 17*a* in the horizontal direction in the drawing in the protrusion portion 17, the area of the protrusion portion 17 in a planar direction of the first DC bus bar 1 is increased. As a result, the laminate region of the positive electrode bus bar 13 and the negative electrode bus bar 14 in the first DC bus bar 1 is increased, so that it is possible to reduce the inductance.

FIG. 4

Figure 4:
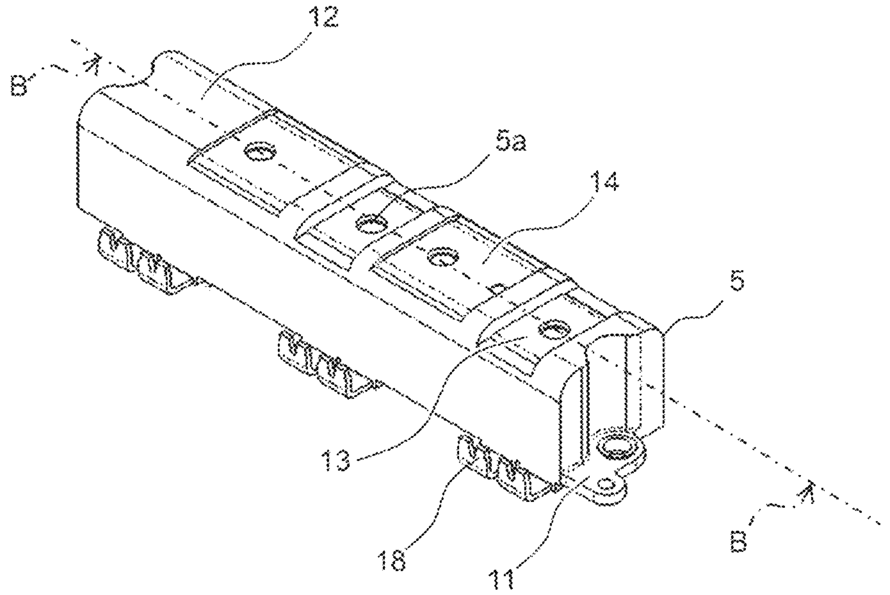
FIG. 4 is an explanatory diagram of a second DC bus bar.
Figure 4:
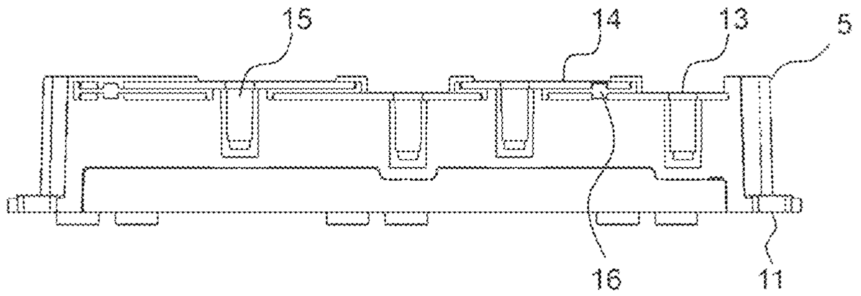
Figure 5:
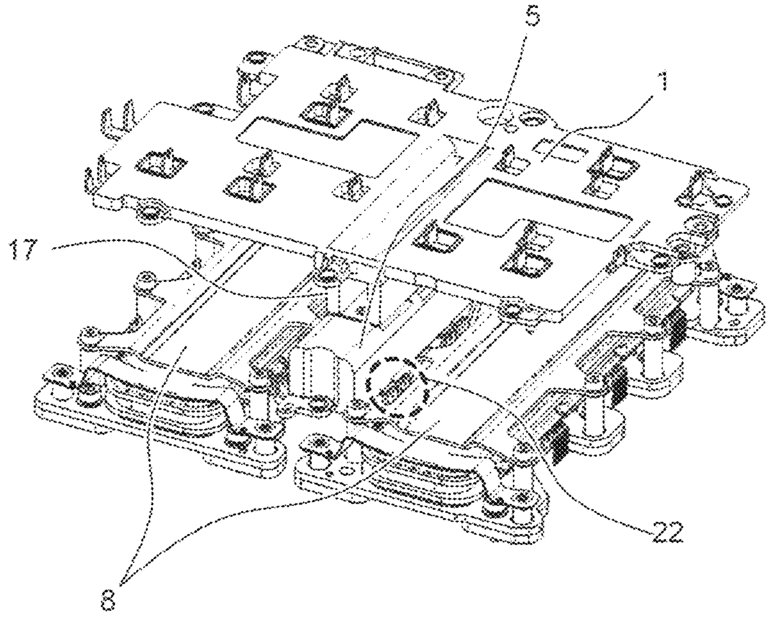
FIG. 5 is a diagram for describing a connection between the first DC bus bar, the second DC bus bar, and a power module.

FIG. 4(*a*) is an overall perspective view of the second DC bus bar 5, and FIG. 4(*b*) is a B-B cross-sectional view of FIG. 4(*a*). Similarly to the first DC bus bar 1, in the second DC bus bar 5, a U-shaped positive electrode bus bar 13 and a U-shaped negative electrode bus bar 14 formed of copper or other metal are disposed. The positive electrode bus bar 13 and the negative electrode bus bar 14 of the second DC bus bar 5 each have two sets of screw fastening points 5*a* which are connection points with the positive electrode bus bar 13 and the negative electrode bus bar 14 of the first DC bus bar 1.

When the first DC bus bar 1 and the second DC bus bar 5 are connected, a screw, a bolt, or the like inserted into the screw fastening point 5*a* is inserted into an insertion nut 15 (pilot hole) formed in the second DC bus bar 5. Since a predetermined interval for taking a sufficient gap between the two sets of screw fastening points 5*a* is provided in the second DC bus bar 5, it is possible to increase a lamination region of the positive electrode bus bar 13 and the negative electrode bus bar 14, which can contribute to reduction in inductance.

The second DC bus bar 5 is a molded product, and is insert-molded 16 by injecting PPS or other resin between the positive electrode bus bar 13 and the negative electrode bus bar 14 in order to ensure insulation. Similarly, the surface of the second DC bus bar 5 is also overmolded 12 with PPS or other resin.

In the second DC bus bar 5, a bush 11 and an insertion nut 15 are molded as an assembling portion to the housing 10 and an assembling portion to the first DC bus bar. The positive electrode bus bar 13 and the negative electrode bus bar 14 have a welding terminal 18 for electrical connection with the power module 8. The second DC bus bar 5 is connected to the power module 8 by welding through the welding terminal 18.

Note that, a welding method using Tungsten Inert Gas (TIG) is used for such welding connection. This TIG welding provides a simple assembly structure, and can contribute to size reduction of the power conversion device 100, reduction in inductance, and improvement in EMC performance.

FIG. 5

The protrusion portion 17 of the first DC bus bar 1 is electrically connected to the second DC bus bar 5. The second DC bus bar 5 is disposed at a position between two power modules 8, and is electrically connected to the two power modules 8 at a third connection portion 22 (welding terminal 18). The first DC bus bar 1 and the second DC bus bar 5 are electrically connected by being coupled to each other with a screw or the like.

FIG. 6

Figure 6:
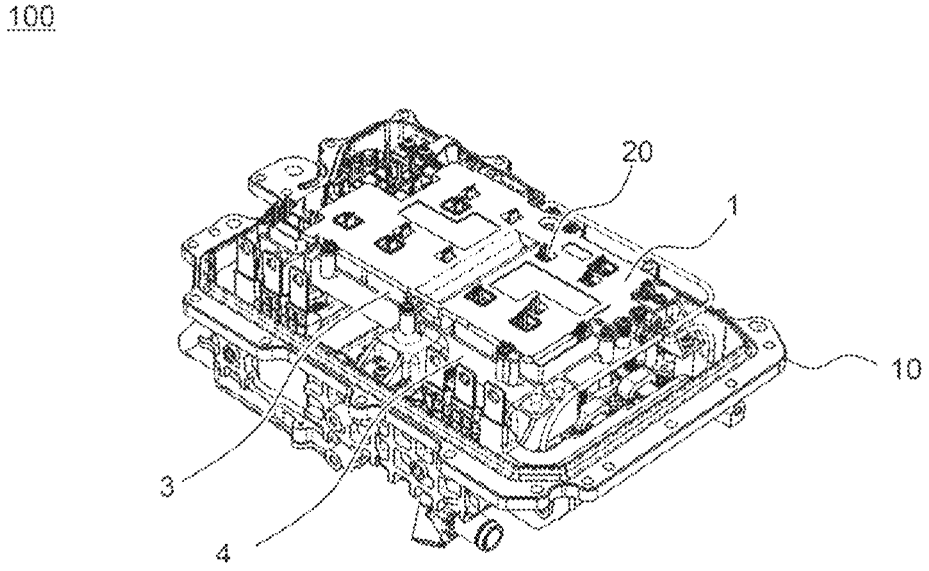
FIG. 6 is an explanatory diagram of the power conversion device in which the first DC bus bar and the second DC bus bar are housed.
Figure 6:
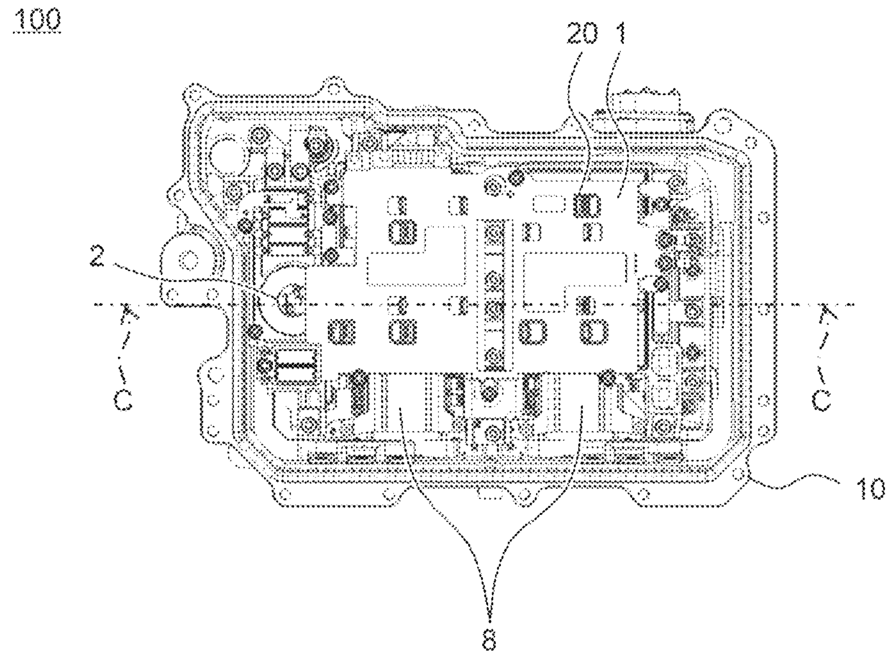

FIG. 6(*a*) is a view illustrating a state in which an internal component is housed in the housing 10, and FIG. 6(*b*) is a view when the inside of the housing 10 in FIG. 6(*a*) is viewed from the top. The first DC bus bar 1 has a first connection portion 20 for connection with the smoothing capacitor 3. The first DC bus bar 1 and the smoothing capacitor 3 are electrically connected by welding connection at the first connection portion 20.

Since the power conversion device 100 has a structure having a bus bar division shape by dividing a bus bar into the first DC bus bar 1 and the second DC bus bar 5, connection points between the bus bars can be reduced to contribute to size reduction, and it is possible to reduce the inductance. In addition, since the second DC bus bar 5 and the power module 8 are connected by welding, screw fixing becomes unnecessary while increasing the lamination area on the power module 8 side.

FIG. 7

Figure 7:
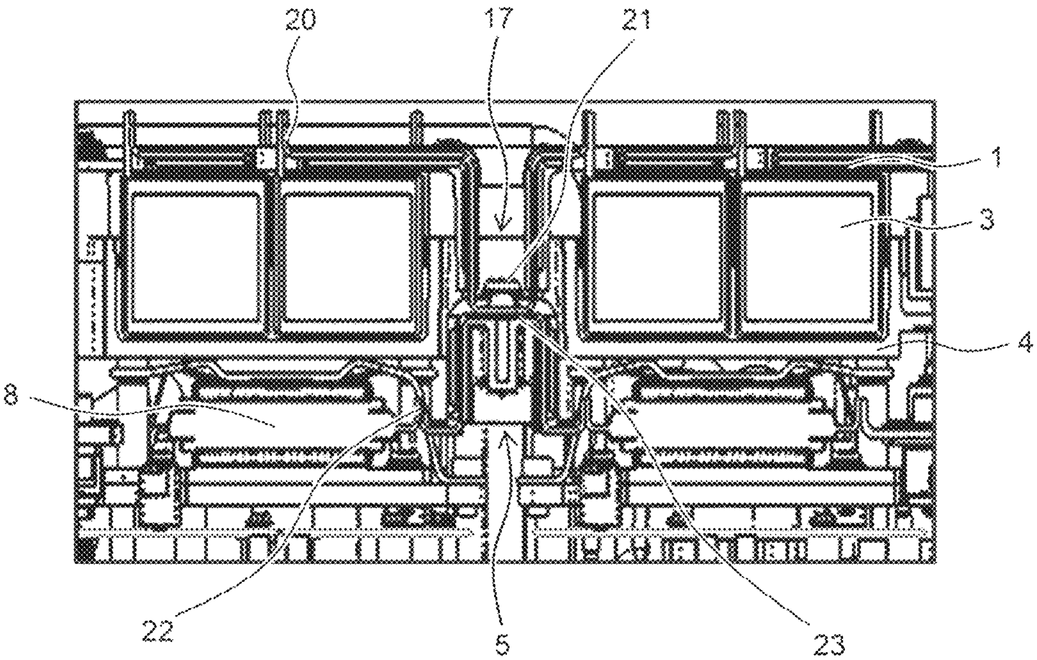
FIG. 7 is a cross-sectional view taken along line C-C in the power conversion device illustrated in FIG. 6 according to the embodiment of the present invention.

As illustrated in FIG. 7 which is a cross-sectional view, the plurality of smoothing capacitors 3 are disposed between the first DC bus bar 1 and the power module 8. The first DC bus bar 1 has the protrusion portion 17 that passes between the plurality of smoothing capacitors 3 and extends to the disposition side of the power module 8, and the first connection portion 20 connected to the smoothing capacitor 3 on the surface of the smoothing capacitor 3 opposite to the disposition side of the power module 8. The smoothing capacitor 3 and the first DC bus bar 1 are connected by welding at the first connection portion 20.

The first DC bus bar 1 has the second connection portion 21 connected to the second DC bus bar 5 at the protrusion portion 17. In addition, the second DC bus bar 5 has a fourth connection portion 23 connected to the second connection portion 21 of the first DC bus bar 1. The first DC bus bar 1 and the second DC bus bar 5 are electrically connected to each other at the second connection portion 21 and the fourth connection portion 23.

Each of the protrusion portion 17 of the first DC bus bar 1 and the second DC bus bar 5 has a U-shaped cross section. The protrusion portion 17 and the second DC bus bar 5 are disposed to be connected to each other on an opposite side of the opening side of the U-shape.

The second DC bus bar 5 has the third connection portion 22. The second DC bus bar 5 is electrically connected to each of the two power modules 8 through the third connection portion 22 (welding terminal 18).

The first DC bus bar 1 and the second DC bus bar 5 are disposed to be covered with the case 4. In addition, the case 4 is disposed between the smoothing capacitor 3 and the power module 8. In this manner, it is possible to reduce the inductance by the eddy current effect. Furthermore, the case 4 is disposed between the smoothing capacitor 3 and the power module 8 including a semiconductor device, so that the shielding effect using the metal plate shielding of the case 4 is exhibited with respect to a DC line by the electrical connection between the first DC bus bar 1 and the second DC bus bar 5. Thus, it is possible to reduce the noise by improving electromagnetic compatibility (EMC) performance.

As described above, since the bus bar connection aggregated at the central portion is made between the plurality of power modules 8 and the plurality of smoothing capacitors 3, it is possible to reduce connection points (screw fastening points) as compared with the conventional case, and it is possible to not only reduce the size but also reduce the inductance. In addition, by reducing the number of connection points or forming the cross section in the U-shape, it is possible to increase the lamination area of the positive electrode bus bar 13 and the negative electrode bus bar 14. In addition, since the connection between the first DC bus bar 1 and the second DC bus bar 5 can be disposed at the center of the device 100, in a dual inverter type configuration using the two power modules 8 as described above, it is possible to efficiently use the space, which can contribute to size reduction.

According to the embodiment of the present invention described above, the following operational effects are obtained.

(1) The power conversion device 100 includes a plurality of power modules 8 that convert DC power into AC power, a plurality of smoothing capacitors 3 that smooth the DC power, a first DC bus bar 1 connected to the plurality of smoothing capacitors 3, and a second DC bus bar 5 connected to the plurality of power modules 8. The first DC bus bar 1 and the second DC bus bar 5 include a positive electrode bus bar 13 and a negative electrode bus bar 14 laminated on each other. The plurality of smoothing capacitors 3 are disposed between the first DC bus bar 1 and the power module 8. The first DC bus bar 1 includes a protrusion portion 17 that passes between the plurality of smoothing capacitors 3 and extends to the disposition side of the power module 8, and a first connection portion 20 that is connected to the smoothing capacitor 3 on a surface of the smoothing capacitor 3 opposite to the disposition side of the power module 8. The protrusion portion 17 includes a second connection portion 21 connected to the second DC bus bar 5. The second DC bus bar 5 includes a third connection portion 22 connected to the power module 8 and a fourth connection portion 23 connected to the second connection portion 21. With such a configuration, it is possible to provide the power conversion device 100 in which a reduction in inductance, size reduction, and improvement in assemblability are juxtaposed.

(2) The protrusion portion 17 of the first DC bus bar 1 and the second DC bus bar 5 each have a U-shaped cross section, and are disposed to be connected to each other on an opposite side of the opening side of the U-shaped cross section. With such a configuration, it is possible to perform the connection between the first DC bus bar 1 and the second DC bus bar 5 in a portion having a large area, and to aggregate the connection portions in one place.

(3) At least one of the first DC bus bar 1 and the second DC bus bar 5 is covered with a storage member 4 made of metal. With such a configuration, the inductance is reduced by the eddy current effect.

(4) The storage member 4 is disposed between the smoothing capacitor 3 and the power module 8. With such a configuration, the shielding effect is exhibited, and thus it is possible to reduce noise by improving EMC performance.

(5) The smoothing capacitor 3 and the first DC bus bar 1 are connected by welding. With such a configuration, it is possible to contribute to size reduction of the power conversion device 100.

(6) The power module 8 and the second DC bus bar 5 are connected by welding. With such a configuration, it is possible to contribute to size reduction of the power conversion device 100.

Note that the present invention is not limited to the above embodiment, and various modifications and other configurations can be combined without departing from the gist of the present invention. In addition, the present invention is not limited to one including all the configurations described in the above embodiment, and includes one in which a portion of the configuration is deleted.

REFERENCE SIGNS LIST

1 first DC bus bar
1*a* screw fastening point
2 noise filter
3 smoothing capacitor
4 DC circuit storage member (case)
5 second DC bus bar
5*a* screw fastening point
6 DC connector
7 AC sensor
8 power module
9 AC bus bar
10 housing
11 bush
12 overmolding
13 positive electrode bus bar
14 negative electrode bus bar
15 insertion nut
16 insert-molding
17 protrusion portion
17*a* lateral width of protrusion portion
18 welding terminal
20 first connection portion
21 second connection portion
22 third connection portion
23 fourth connection portion
100 power conversion device

The invention claimed is:

1. A power conversion device comprising:

a plurality of power modules that converts DC power into AC power;

a plurality of smoothing capacitors that smooths the DC power;

a first DC bus bar that is connected to the plurality of smoothing capacitors; and a second DC bus bar that is connected to the plurality of power modules, wherein the first DC bus bar and the second DC bus bar include a positive electrode bus bar and a negative electrode bus bar laminated on each other, the plurality of smoothing capacitors are disposed between the first DC bus bar and the power module, the first DC bus bar includes a protrusion portion that passes between the plurality of smoothing capacitors and extends to a disposition side of the power module, and a first connection portion that is connected to the smoothing capacitor on a surface of the smoothing capacitor opposite to a side on which the power module is disposed, the protrusion portion includes a second connection portion connected to the second DC bus bar, and the second DC bus bar includes a third connection portion connected to the power module and a fourth connection portion connected to the second connection portion.

2. The power conversion device according to claim 1, wherein each of the protrusion portion of the first DC bus bar and the second DC bus bar has a U-shaped cross section, and is disposed to be connected to each other on an opposite side of an opening side of the U-shaped cross section.

3. The power conversion device according to claim 1, wherein at least one of the first DC bus bar and the second DC bus bar is covered with a storage member made of metal.

4. The power conversion device according to claim 3, wherein the storage member is disposed between the smoothing capacitor and the power module.

5. The power conversion device according to claim 1, wherein the smoothing capacitor and the first DC bus bar are connected by welding.

6. The power conversion device according to claim 1, wherein the power module and the second DC bus bar are connected by welding.

* * * * *